June 30, 1925.

M. LOEWENTHAL 1,544,327

DIAGRAM CHART

Filed March 24, 1922   2 Sheets-Sheet 1

Inventor
M. Loewenthal
By his Attorney

June 30, 1925.

M. LOEWENTHAL 1,544,327

DIAGRAM CHART

Filed March 24, 1922  2 Sheets-Sheet 2

Inventor
M.Loewenthal
By his Attorney

Patented June 30, 1925.

1,544,327

UNITED STATES PATENT OFFICE.

MARC LOEWENTHAL, OF NEW YORK, N. Y.

DIAGRAM CHART.

Application filed March 24, 1922. Serial No. 546,270.

*To all whom it may concern:*

Be it known that I, MARC LOEWENTHAL, a citizen of the United States, and a resident of the city, county, and State of New York, have invented certain new and useful Improvements in a Diagram Chart, of which the following is a full, clear, and exact description.

This invention relates to measuring and drawing devices and in particular to one which may be used by real estate, insurance, and other persons interested in the charting of property.

A particular object of the invention is the provision of a device through the use of which the position of real estate property may be diagrammatically set down on paper to scale and in correct proportions.

A further object of the invention is to provide in conjunction therewith suitable markings through the medium of which, the sizes of lots may be laid off and means for drawing without a ruler or square, parallel lines necessary in charting real estate locations.

Drawings.

Description.

Figure 1:
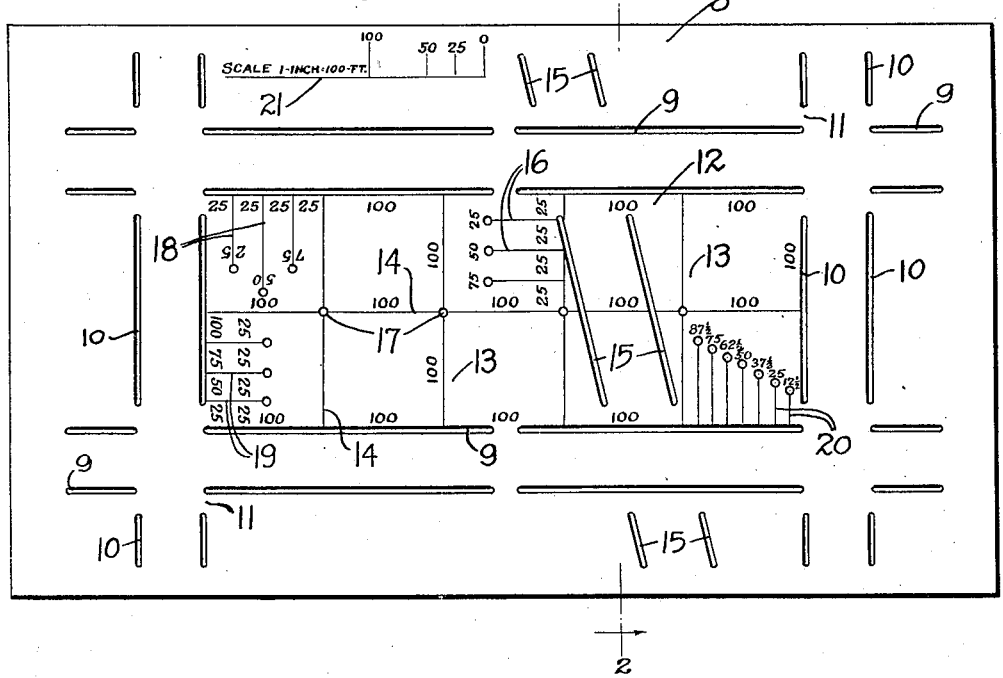
Figure 1 is a plan view of my diagram chart or stencil, showing the slots and openings therein, together with the necessary etched lines which divide off the chart to scale.
Figure 2:
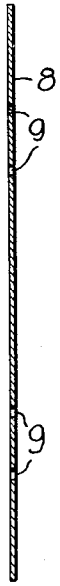
Figure 2 is a section of the chart taken on the line 2—2 of Figure 1, and showing the relative thickness thereof.

In the drawings, and particularly Figure 1, 8 denotes my diagram chart, layout or stencil, which is preferably constructed of any transparent material such as sheet celluloid, and is formed to comprise longitudinally extending parallel slots 9 and transversely extending parallel slots 10, all of which terminate adjacent each other to leave a space 11 therebetween for the obvious purpose of preventing the parts surrounded thereby from falling out or otherwise weakening the stencil.

In laying out the slots, four streets have been formed which surround a center block 12 which is divided into hundred foot parts 13 by lines 14 etched on the stencil.

Across the stencil and passing through the center block 12 are formed the diagonally disposed parallel slots 15 which are used to draw a diagonally running street or avenue.

At the intersections of the etched lines there are provided small holes 17 through which a pencil point may be inserted to mark the paper upon which the chart is being drawn, and each one hundred feet of etched line is marked "100" to denote its length. At the substantial middle of the block 12 the etched lines 16 terminating in the holes marked "25, 50 and 75" serve to show how the lots, at the intersection of the diagonally extending avenue, and street, would be laid out.

In the upper left-hand corner of block 12 there are laid off etched lines 18 dividing the lot into four twenty-five foot lots, the lines terminating in the holes which are marked successively "25, 50, 75", the middle line being extended to allow for laying off an angular twenty-five foot lot which would face on two streets one at right angles to the other.

The etchings 19 and holes in the lower left-hand corner of the block are provided for laying off a series of lots having the same depth and are marked successively "25, 50, 75, 100," with the width of each individual lot being noted as "25."

In the lower right-hand corner, the lines 20 are of different lengths, each increasing progressively by twelve and one-half feet, and terminate in the holes which are correspondingly designated to indicate the length in feet, starting at "12½" of their respective lines. It will be noted that the lines 20 are spaced twelve and one-half feet apart, so that any width of lot may be laid off.

The chart is further provided with a suitable scale 21 showing the relative sizes of the markings thereon, and the scale to which the chart is laid out, it being understood that if any other scales were necessary, additional charts or stencils could be made to suit.

Figure 3:
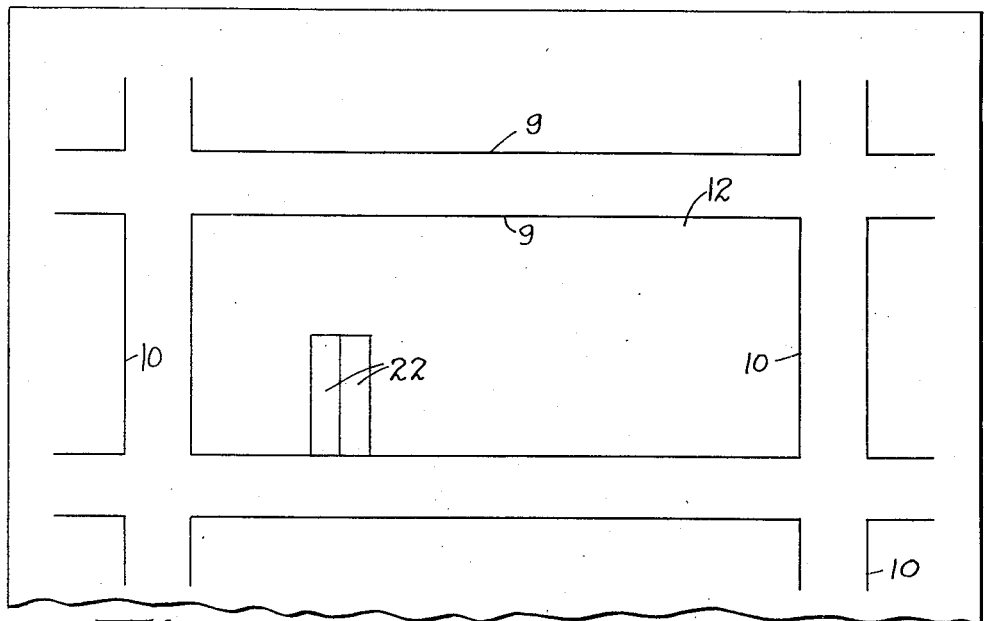
Figure 3 is a digram drawn with the aid of my chart showing the location of a piece of property, the same being laid out to scale, and therefor showing the relative size of a piece of property.

With the aid of my chart it is then only necessary to draw the streets as shown in Figure 3, through the slots 9 and 10, and connect the lines drawn therethrough, then the chart is used to lay off the lots 22 illustrated, their location, depth and width being readily obtained from the chart by using any of the etched lines and the associated holes which are properly marked to show both depth and width.

Figure 4:
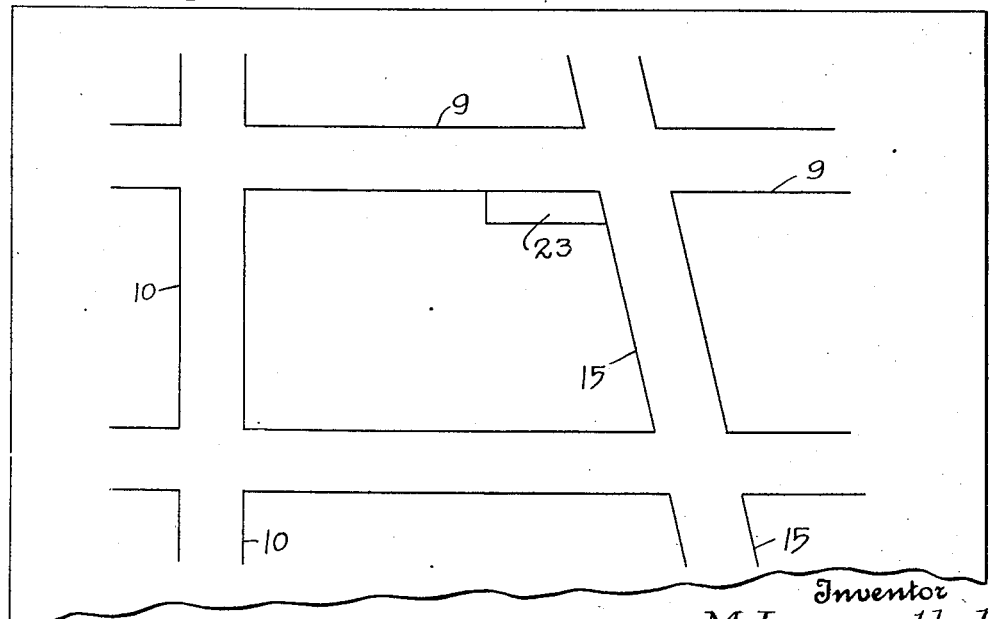
Figure 4 is another diagram, in which an avenue passes diagonally, the location of property at the intersection of street and avenue being to scale with the use of the chart.

When, as seen in Figure 4, a diagonally disposed avenue is needed, the same is drawn through the slots 15 of the chart, and in laying off a lot 23 which is bounded on one side by the avenue, the etched lines 16 and associated holes are used.

When using the chart to obtain the various measurements and point locations, it is easy, because of the transparency of the chart, to locate the scale or indices as desired on the diagram. For instance, if a diagram was being used to show the location of a lot 50 feet from one street and facing on another, the lines 18 and 19 would be employed to locate the side of the lot nearest the street from which the measurement is taken. Then the chart would be shifted so as to employ the calibrations and lines 20 where it would be found that measurements on the divisions of 12½ feet are employed, and by use of which, it would be easy to show a line drawn with reference to the first inscribed line, a distance 37½ feet. The transparent feature of the chart admits of its use in many ways, for adding to, or correcting diagrams which have been previously produced.

Claims.

1. A device of the class described, comprising a transparent elongated rectangular layout formed to provide a plurality of longitudinally, transversely and diagonally disposed slots arranged in aligning and non-intersecting pairs respectively, said layout having a series of lines etched on its upper surface and intersecting to divide a portion of the surface into equal spaces, said layout being also formed to provide a series of circular openings associated with said slots and lines, whereby a diagram may be plotted on a sheet of paper positioned beneath the layout by the insertion of a marking implement through said slots and openings.

2. A device of the class described, comprising an elongated rectangular layout formed to provide a plurality of longitudinally, transversely and diagonally disposed slots arranged in aligning and non-intersecting pairs respectively, said layout having a series of lines etched on its upper surface and intersecting to divide a portion of the surface into spaces and other lines to divide the spaces formed by said intersecting lines into scaled portions, said layout being also formed to provide a series of circular openings associated with said last mentioned lines, whereby a diagram may be plotted on a sheet of paper positioned beneath the layout by the insertion of a marking implement through said slots and openings.

MARC LOEWENTHAL.